United States Patent Office 3,397,247
Patented Aug. 13, 1968

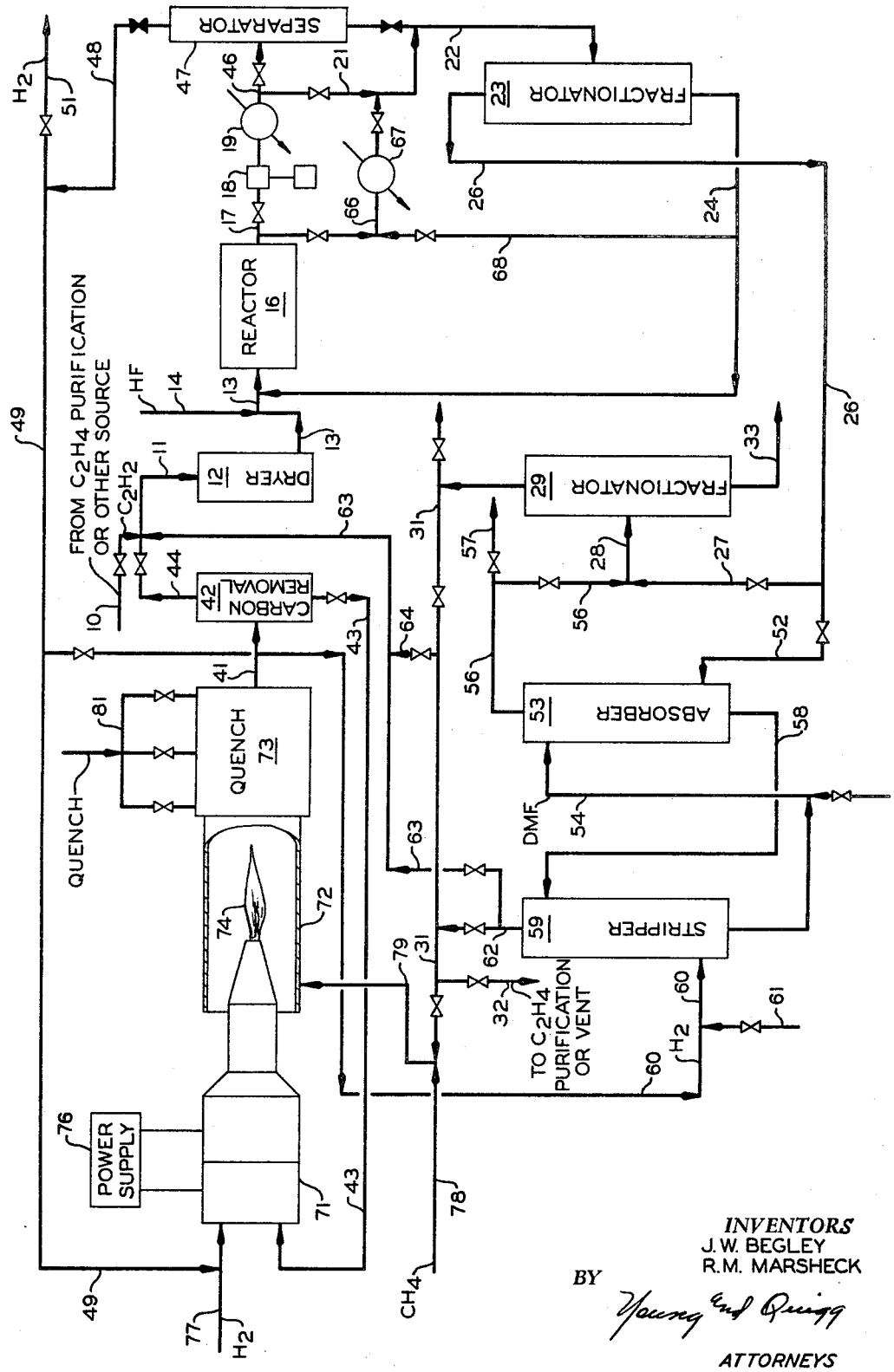

3,397,247
PRODUCTION OF UNSATURATED
MONOFLUORIDES
John W. Begley, Berkeley, Calif., and Robert M. Marsheck, Bartlesville, Okla., assignors to Phillips Petroleum Company, a corporation of Delaware
Filed Dec. 30, 1964, Ser. No. 422,260
7 Claims. (Cl. 260—653.4)

ABSTRACT OF THE DISCLOSURE

In a process for catalytically hydrofluorinating an acetylenic hydrocarbon, e.g., acetylene, with hydrogen fluoride, the reaction zone effluent is fractionated in a novel fractionation step to remove a mixture of hydrogen fluoride and gem-difluoroalkane, and said mixture is recycled to said reaction zone to provide novel combinations of steps for carrying out said process.

---

This invention relates to the production of unsaturated monofluorides. In one aspect this invention relates to a process for the production of unsaturated monofluorides. In another aspect this invention relates to a combination of apparatus which can be employed in the production of unsaturated monofluorides.

When an acetylenic hydrocarbon is reacted with hydrogen fluoride over a hydrofluorination catalyst such as alumina, bauxite, aluminum fluoride and the like, the product usually comprises a mixture of a saturated gem-difluoroalkane with an unsaturated monofluoride, each containing the same number of carbon atoms to the molecule as the acetylenic hydrocarbon. Since both these products have valuable commercial uses and their separation can be readily effected, such a process has numerous advantages. However, due to their valuable properties as monomers or comonomers in the production of vinyl resins as well as other important applications, it would often be desirable to produce the unsaturated monofluorides alone, without diversion of starting material to the concomitant production of gem-difluoroalkanes. One method for effecting such conversion lies in separating the gem-difluoroalkane from the reaction mixture obtained from hydrofluorination of an acetylenic hydrocarbon and subjecting it to further treatment in a second reactor whereby the gem-difluoroalkane is converted to an unsaturated monofluoride. However, in such a two step operation, considerable added equipment is required with correspondingly increased operating costs.

Another difficulty often encountered in the manufacture of unsaturated monofluorides in the presence of contaminants, e.g., diluents, impurities, etc. in the acetylenic hydrocarbon feedstock. Such impurities in the feedstock must be removed from said feedstock prior to reaction to form the unsaturated monofluorides, or else separated from the monofluoride product when it is recovered from the reaction mixture. In either situation said contaminants complicate the process by requiring additional feedstock or product purification equipment. This results in increased operating costs as well as increased investment costs.

The present invention provides a solution to the above-described difficulties by providing a process wherein the same reactor is utilized for production of the unsaturated monofluorides and reversion of the concurrently produced gem-difluoroalkane to said unsaturated monofluoride. In the practice of the invention, this is accomplished by the separation from the reaction mixture of a stream comprising said gem-difluoroalkane and unreacted hydrogen fluoride, and recycle of said stream to the reactor. The invention also provides for the utilization of certain feedstocks, containing a predominant amount of an acetylenic hydrocarbon, which does not need purification. Thus, in one broad aspect, the present invention resides in a process for the production of unsaturated monofluorides by hydrofluorinating an acetylenic hydrocarbon with hydrogen fluoride wherein the gem-difluoroalkane, concurrently produced with said unsaturated monofluoride, is efficiently separated from the reaction mixture in admixture with unreacted hydrogen fluoride and said separated mixture is recycled to the reactor. In another broad aspect, the invention resides in the utilization of certain acetylenic hydrocarbon-containing feed streams which do not require purification in integrated processes for the production of unsaturated monofluorides, and in combination of apparatus which can be employed in said integrated processes.

An object of this invention is to provide a process for the production of organic unsaturated monofluorides by the interaction of acetylenic hydrocarbons with hydrogen fluoride. Another object of this invention is to effect the interaction of acetylenic hydrocarbons with hydrogen fluoride in such a manner that unsaturated monofluorides form the principal reaction product. Another object of this invention is to react acetylenic hydrocarbons with hydrogen fluoride and to separate a mixture of unreacted hydrogen fluoride and a gem-difluoroalkane concurrently produced during the reaction, and recycle said separated mixture to the reaction zone to produce additional unsaturated monofluorides. Still another object of this invention is to react acetylenic hydrocarbons with hydrogen fluoride and acetylenic hydrocarbons with gem-difluoroalkanes in the same reaction zone in such a manner that unsaturated monofluorides are the principal reaction product. Another object of this invention is to provide integrated processes for the production of unsaturated monofluorides utilizing certain acetylenic hydrocarbon-containing feedstocks which do not require purification. Still another object of this invention is to provide a combination of apparatus which can be employed in said integrated processes. Other aspects, objects, and advantages of the invention will be apparent to those skilled in the art in view of this disclosure.

Thus, according to the invention, there is provided a process for producing an unsaturated monofluoride hydrocarbon derivative, which process comprises: reacting hydrogen fluoride and an acetylenic hydrocarbon in a reaction zone under hydrofluorination conditions in the presence of a hydrofluorination catalyst; withdrawing reaction mixture effluent from said reaction zone; fractionating said effluent to obtain therefrom a first stream comprising said unsaturated monofluoride hydrocarbon derivative and unreacted acetylenic hydrocarbon, and a second stream comprising unreacted hydrogen fluoride and a gem-difluoroalkane containing the same number of carbon atoms as said acetylenic hydrocarbon reactant; recycling said second stream to said reaction zone; and recovering said unsaturated monofluoride hydrocarbon derivative from said first stream.

Further according to the invention, there are provided combinations of apparatus which can be employed in the production of unsaturated monofluorides.

When operating according to our method, a reactor charged with a solid type contact catalyst is fed with a stream comprising an acetylenic hydrocarbon, a stream comprising hydrogen fluoride, and a stream comprising hydrogen fluoride in admixture with a gem-difluoroalkane. Said streams can be charged to said reactor singly or in various mixtures. In the reactor two reactions proceed concurrently, the one between the acetylenic hydrocarbon and hydrogen fluoride and the other between the acetylenic hydrocarbon and the gem-difluoroalkane. In the first reaction, that of hydrofluorination, the acetylenic hydrocarbon is converted to an unsaturated monofluoride and a gem-difluoroalkane. In the second reaction, that of reversion or dehydrofluorination, the gem-difluoroalkane is reacted with the acetylenic hydrocarbon to produce an unsaturated monofluoride. Effluent from the reactor comprises in addition to unreacted hydrogen fluoride and unreacted acetylenic hydrocarbon, unsaturated monofluoride and gem-difluoroalkane.

The acetylenic hydrocarbons that we prefer to use in the practice of our invention are those hydrocarbons having an acetylenic carbon-to-carbon linkage or triple bond. Typical examples are acetylene, propyne, 1-butyne, 2-butyne, 2-pentyne, 1-hexyne, 3-octyne, 2-decyne, 3-methyl-1-pentyne, and 2,5-dimethyl-3-hexyne. Although less preferable, we can use those acetylenic hydrocarbons containing an acetylenic triple bond and an olefinic double bond within the hydrocarbon molecule. An example of this less preferred type is hexene-5-yne-1. We prefer to use acetylenic hydrocarbons having no more than 10 carbon atoms per molecule. However, this is merely a preference and not a critical limitation. The acetylenic hydrocarbons are reacted with hydrogen fluoride in such a manner that one or two molecules of hydrogen fluoride add to the unsaturated carbon atoms of one molecule of the acetylenic hydrocarbon, and, as a consequence, products of this addition reaction comprise essentially unsaturated monofluorides having an olefinic carbon-to-carbon linkage wherein the fluoride radical is attached to one of the unsaturated carbon atoms, and gem-difluoroalkanes which are saturated hydrocarbons containing two fluoride radicals or substituent groups attached to one of the carbon atoms in the molecule. Examples of said gem-difluoroalkanes are: 1,1-difluoroethane, 1,1-difluoropropane, 2,2-difluoropropane, 1,1-difluorobutane, 2,2-difluorobutane, 2,2-difluoropentane, 2,2-difluorohexane, 3,3-difluorooctane, 1,1-difluorodecane, 2,2-difluorodecane, 2,2-difluoro-3-methylpentane, and 3,3-difluoro-2,5-dimethylhexane. These products of the addition reaction will contain carbon atoms corresponding in number to the starting acetylenic hydrocarbons.

The presently most preferred acetylenic hydrocarbon for use in the practice of the invention is acetylene to produce vinyl fluoride and 1,1-difluoroethane, said 1,1-difluoroethane being recycled to the reaction zone as described herein to produce additional vinyl fluoride.

Our invention is not limited to employing any particular catalyst in the reaction zone. Any suitable catalyst which is active for hydrofluorinating acetylenic hydrocarbons with hydrogen fluoride and which is active for causing the above-described reversion of gem-difluoroalkanes can be employed in the practice of the invention. The presently preferred catalysts are those comprising alumina. The alumina used in such catalysts is a high porous, high surface area type having a surface area of at least 50, preferably at least 100 square meters per gram. Preferably, the alumina is eta- or gamma-alumina; less preferably the alumina can be bauxite. The alumina can be used alone or it can be combined with a metal-containing constituent. Examples of such catalysts comprising alumina are alumina and alumina combined with fluorides of such metals as aluminum, antimony, cobalt, cadmium, chromium, copper, silver, vanadium, iron, nickel, and zinc. Said combined catalysts are particularly useful in the practice of the invention. Said combined satalysts can be physical mixtures or composites, or, preferably, the alumina can be used as a support for the metallic fluorides. Such supported catalysts can be prepared by impregnating the alumina with a solution containing the metal and then fluorided by treatment with HF. The catalyst is preferably in either a pelleted or a granular form, and it can be employed as a fixed bed of relatively coarse granules, as a bed of finely divided particles in ebullient motion in a stream of upward flowing reactants (a so-called "fluidized" bed), or as a stream of finely divided particles passing through a reaction zone.

A presently more preferred catalyst is a fluorided alumina prepared by treating alumina with a mixture of hydrogen fluoride and a diluent. Under conditions of elevated temperature, the alumina or alumina-metal composite described above will react vigorously with hydrogen fluoride vapor, and the fluorine content of the resulting product represents a substantial conversion of the alumina to fluorine-containing compounds of aluminum. This reaction is highly exothermic, and if not controlled may produce sufficient heat to cause sintering of the catalyst. In order to prevent overheating, it is desirable that an inert diluent gas be mixed with the hydrogen fluoride used in the reaction. Although nitrogen is the preferred diluent, any other gas which is inert toward the catalyst, reactants, and products of this invention under the reaction conditions employed may be used, such as carbon dioxide, carbon monoxide, helium, neon, argon, and the like. The concentration of the diluent in the hydrogen fluoride will normally be maintained at 20–80 mol percent, and preferably 40–60 mol percent.

To initiate the reaction at a desirable rate and to insure complete removal of water from the system, the temperature of the alumina is brought to a minimum of 220° F., and prefereably to 250° F. As the diluent containing hydrogen fluoride is introduced to the bed of alumina, a zone of high exotherm will result, starting at the inlet side of the alumina bed, and advancing across the bed to the outlet. It is desirable to maintain the maximum temperature reached in the hot zone below 750° F., and preferably below 650° F. This temperature is controlled by the rate of gas flow through the bed, as well as by the ratio of the hydrogen fluoride to diluent in the gas stream. A flow rate of between 10 and 1000, and more preferably between 50 and 500, volumes (standard conditions) per volume of catalyst per hour is normally maintained. The gas flow is continued until the hot reaction zone has passed completely through the catalyst, at which time a copious amount of hydrogen fluoride is observed in the effluent gas.

The nature of the chemical compound formed by this reaction is undetermined, but it is believed to be some type of oxyfluoride or a combination of oxides, fluorides, and oxyfluorides. The fluoride content of the catalyst is in the range of 50–60 percent. This is well below the theoretical content of fluoride in aluminum trifluoride.

Further details regarding said fluorided alumina catalysts can be found in copending application Ser. No. 398,442, filed Sept. 22, 1964, by Lloyd E. Gardner.

In the practice of the invention the molar ratio of hydrogen fluoride to acetylenic hydrocarbon is usually maintained within the range of 0.5:1 to 20:1, preferably 1:1 to 5:1. The most preferred molar ratio for said reactants is in the order of 1:1, 2:1, but said ratio is sometimes maintained somewhat higher for reasons of over-all operating efficiency in particular processing schemes.

The temperature employed in the reaction zone in the practice of the invention is usually maintained within the range of from 350 to 900° F. preferably within the range of from 600 to 750° F. The pressure employed in the reaction zone is not critical and is usually maintained within the range of 0.1 to 10 atmospheres. Preferably, said pressure is maintained within the range of from 0.5 to 1.5 atmospheres. However, pressures outside said ranges can be employed in the practice of the invention.

The flow rate of reactants through the reaction zone in contact with the catalyst can vary over a wide range. Said flow rate is usually maintained within the range of from 50 to 5000 volumes (standard conditions) of total reactants per volume of catalyst per hour, preferably within the range of 200 to 1000, more preferably within the range of from 400 to 600 volumes per volume of catalyst per hour.

Referring now to the drawing, the invention will be more fully explained. Said drawing is a diagrammatic flow sheet illustrating various embodiments of the invention. In said drawing much conventional equipment such as pumps, valves, flow regulators, heating means, cooling means including refrigeration equipment, etc., not necessary for explaining the invention to those skilled in the art, has been omitted so as to simplify said drawing. It will be understood, however, that a process including various items of said conventional equipment is within the scope of our invention.

In one embodiment of the invention, an acetylene-containing stream is introduced via conduits 10 and 11 into dryer 12. Said acetylene-containing stream can be obtained from any source. One presently preferred such stream is a stream resulting from the purification of an ethylene-containing stream by contact with a dimethylformamide solution. In the production of ethylene for use in the manufacture of polyethylene, a hydrocarbon stream such as propane is cracked to obtain a stream comprising ethylene and acetylene. It is essential that the acetylene be removed from the ethylene stream which is to be used in the manufacture of polyethylene. This is accomplished by contacting said ethylene stream with dimethylformamide absorbent and operating the contacting step under conditions so as to produce a stream of essentially pure ethylene and a stream containing both acetylene and ethylene. Said last mentioned streams commonly contain from 25 to 50 mol percent ethylene. The reactants should be reasonably dry to avoid corrosion problems and dryer 12 is employed to dry the hydrocarbon feed stream. Ordinary or commercial anhydrous hydrogen fluoride contains traces of water which can be tolerated.

Dryer 12 can comprise any suitable type of drying means such as a tower containing a bed of a suitable absorbent, e.g., bauxite, alumina, etc., capable of absorbing moisture from said acetylene-containing stream. Although only one dryer is shown, it will be understood that a plurality of said dryers, suitably manifolded together for alternate operation on process and regeneration, can be employed. An essentially dry feed stream is removed from dryer 12 via conduit 13. A stream of anhydrous hydrogen fluoride is introduced via conduit 14 into said conduit 13 where it is mixed with the acetylene-containing feed stream. Although not shown in the drawing, it will be understood that said conduit 13 can have disposed therein any suitable means for mixing said HF and said acetylene-containing stream. The resulting mixture passes via said conduit 13 into reactor 16 wherein it contacts a suitable catalyst at conditions more fully described elsewhere herein. It will be understood it is within the scope of the invention to introduce said acetylene-containing feed stream and said HF stream into reactor 16 as separate streams. The reactions in reactor 16 are exothermic. Any suitable means can be employed for removing the heat of reaction. One means is to employ a heat exchange coil in the catalyst zone and circulate water or other heat exchange medium thereto. When water is so circulated, this provides a convenient means for generation of steam. The effluent from reactor 16, which contains the unsaturated monofluoride, e.g., vinyl fluoride, and the saturated gem-difluoride derivative of the acetylenic hydrocarbon, e.g., 1,1-difluoroethane, in addition to unconverted reactants, is passed via conduit 17 into compressor 18 wherein it is compressed. Said compressed reaction mixture is cooled in condenser 19 and then passed via valved conduit 21 and conduit 22 into low temperature fractionator 23.

The temperature to which the reaction mixture is cooled in condenser 19 is maintained within relatively narrow limits, dependent upon the acetylenic hydrocarbon used, since the boiling point of the fluoro hydrocarbons is usually only a few degrees above the solidification point of the acetylenic hydrocarbon. Thus, the temperature within condenser 19 is maintained at or below the temperature at which the fluoro hydrocarbons are condensed but above the temperature at which the acetylenic hydrocarbon is solidified. The specific temperature limits are dependent upon the particular acetylenic hydrocarbon used in the process.

In said fractionator 23 the compressed and cooled reactor effluent is fractionated to remove as bottoms product therefrom a stream comprising hydrogen fluoride and the gem-difluoroalkane, e.g., 1,1-difluoroethane, and this bottoms product mixture is recycled via conduit 24 to conduit 13 for introduction into reactor 16 along with the fresh charge.

An overhead product comprising unreacted acetylene, ethylene, and vinyl fluoride is removed from said fractionator 23 via conduit 26 and introduced via conduits 27 and 28 into low temperature fractionator 29. A stream comprising unreacted acetylene and ethylene is removed overhead from said fractionator 29 via conduit 31 and is usually passed via conduit 32 to an ethylene purification step, such as that described above, or is vented from the system.

The unsaturated monofluoride, e.g., vinyl fluoride, is withdrawn from said fractionator 29 via conduit 33 as the principal reaction product of the process.

In another embodiment of the invention, an acetylene-containing stream obtained directly from the cracking of hydrocarbons can be utilized as the source of acetylenic hydrocarbon, e.g., acetylene. Methods are known in the art for the cracking of hydrocarbons to substantially complete destruction and, in accordance with the invention, the effluent from such a cracking step can be utilized directly as feedstock with considerable savings in feedstock purification costs. One such process for the production of acetylenic hydrocarbons comprises employing a plasma torch or generator in the cracking step. Suitable hydrocarbon reactants that can be employed as starting materials for the production of acetylene or acetylenic hydrocarbons include saturated hydrocarbons such as methane, ethane, propane, butane, pentane, etc. or mixtures of these. Hydrocarbon streams which are predominantly methane, such as natural gas, are the presently preferred starting materials. It is also within the scope of the invention to subject the hydrocarbon reactant feed material to cracking conditions prior to contacting with the plasma stream to crack at least a portion of the reactant feed to less saturated materials. The thus treated reactant feed material will contain unsaturated hydrocarbons such as ethylene, propylene, butylene, isobutylene, and the like, depending upon the particular hydrocarbon fraction and the particular cracking conditions prior to contacting with the plasma stream. Utilization of unsaturated materials as reactant feed materially reduces the electrical energy required in the plasma jet.

Plasma flame generators and plasma stream producing devices are known in the art and do not, per se, form a part of the invention other than in combination with other steps in a process of the invention or in combination with other elements of apparatus employed in the practice of the invention. Thus, any plasma stream apparatus known in the art can be utilized in the practice of the invention so long as the apparatus produces a high temperature plasma stream which effects conversion of the materials contacted therewith as set forth herein. Suitable plasma flame generators that can be employed are disclosed in U.S. Patent 2,960,594, Thorpe, issued Nov. 15, 1960, and U.S. Patent 2,922,869, Giannini et al., issued Jan. 27, 1960.

A plasma stream can be defined as consisting essentially of neutral gas, ions and electrons at high temperature and can be produced by passing a suitable gas such as argon, helium, hydrogen, etc. through an arc produced by high density current between two suitable electrodes. Such a plasma arc torch is capable of attaining temperatures in the range of 3000 to 30,000° F. and at this temperature range any hydrocarbon feed which is introduced into the plasma jet becomes vaporized and subjected to cracking temperatures.

Referring again to the drawing, a plasma torch apparatus generally designated by the reference numeral 71 is connected to reaction section 72 and quench section 73 downstream from the outlet of plasma flame generator 71. Plasma torch 71 can be any suitable known plasma flame generator capable of generating a high temperature plasma stream 74 shown extending into reaction section 72. Torch 71 is connected to a suitable source of electrical power or supply 76 connected to suitable electrodes (not shown) within plasma torch 71 to heat and ionize the plasma forming material or gas.

The plasma stream apparatus or generator employed in the practice of the invention is preferably energized with direct current. However, alternating current can be used. The plasma-forming gas is converted in the torch to a free plasma and leaves the nozzle and passes out of contact with the arc as a free plasma stream being projected from the nozzle. The plasma-forming gas is passed into the reaction chamber 72, preferably at a velocity and/or pressure sufficient that the same will emerge from the nozzle as a free plasma stream having a velocity of at least 5 and preferably at least 50 feet per second and most preferably of at least 500–1000 feet per second. Plasma flame temperatures ranging from 3000° F. to 30,000° F. can be achieved depending upon the type of apparatus employed, the plasma-forming gas, and other considerations. If desired, mixtures of various gases or other materials can be used as the plasma-forming material for operational reasons rather than chemical action reasons. For example, a mixture of hydrogen and argon has been successfully operated for reducing the arc voltage required by the use of pure hydrogen.

Ordinarily the voltage impressed between the nozzle of the torch and the plain electrodes is in the range of 20 volts to 500 volts so as to effect current flow between the nozzle and electrode in the range of 20 amperes to 2000 amperes. The electrode positions are important to the efficient and stable operation of the plasma generating apparatus. It is generaly desirable for such apparatus to convert as much as possible of the plasma gas flowing through the apparatus into the actual plasma. This avoids waste of gas and also avoids the detrimental cooling effect of gas below plasma temperature. For the proper operation of a plasma torch apparatus, it is important that the flow of plasma gas be properly coordinated with the flow of electric current to the arc. It is usually advisable to start the plasma gas flowing before igniting the arc and then to only ignite the are at low amperage, afterwards gradually increasing the current input to the arc. It is sometimes advisable to arrange to perform these functions automatically using known automation expedients to avoid damage to the equipment which might result from the failuer of the operator to adjust the gases and current flow properly. Both the electric arc stream and the random plasma stream emit ultraviolet and infrared frequency radiation. It is therefore advisable for operators in the vicinity of the apparatus to employ adequate radiation protection.

A plasma-forming gas, such as hydrogen, is introduced into torch 71 via conduit 77. Recycle hydrogen recovered from the plasma stream effluent can be introduced into conduit 77 by way of conduit 49. Hydrogen introduced into torch 71 by way of conduit 77 is passed through an arc produced by high density current between two suitable electrodes (not shown) within torch 71 to heat the hydrogen above its dissociation temperature and exits torch 71 as plasma flame or stream 74 within reaction section 72. A hydrocarbon reactant stream, for example, methane or a methane-ethane mixture, is introduced via conduits 78 and 79 into reaction section 72 for contacting with plasma stream 74. Said hydrocarbon reactant stream is preferably introduced directly into or adjacent to said plasma stream 74.

Within reaction section 72, the hydrocarbon feed is contacted with the high temperature hydrogen plasma stream 74 under conditions effecting cracking of the hydrocarbon feed to produce an effluent stream containing acetylene, vinylacetylene, hydrogen, carbon, methane, and ethylene, which is passed to quench section 73. The acetylene-forming reaction takes place at a temperature in the range above discussed, at a reaction time within the range of 0.001 to 0.10 second, usually 0.001 to 0.05 second, the major portion of which takes place in reaction section 72.

A suitable quench fluid is introduced into the plasma effluent in quench zone 73 to reduce the temperature of the plasma effluent to a temperature below the reaction or cracking temperature of the hydrocarbon feed introduced into section 72, as well as below the temperature at which acetylene and/or ethylene in the effluent react further to form polymer or other products. The quench fluid is introduced into quench section 73 by way of quenching means 81 which is shown in the drawing as being a multipoint injection apparatus. However, depending upon the particular quench fluid utilized and the ultimate product desired, one or more of the quenching points will be utilized in said quench zone 73. The amount of quenching fluid introduced through means 81 is obviously dependent upon the amount of quenching needed. Suitable quench fluids that can be employed include hydrocarbon reactant, recycle hydrocarbons recovered from the effluent, and the like.

Effluent from said quenching zone 73 is passed via conduit 41 into carbon removal zone 42 wherein carbon formed in the cracking reaction is removed. Said carbon removal means can comprise any suitable means such as cyclones, electrical precipitators, scrubbers, bag filters, etc. for removing carbon from the gaseous effluent stream. If desired, said carbon can be recycled from zone 42 via conduit 43 for introduction into the plasma generator. The plasma generator effluent, now substantially free of carbon, is removed from said zone 42 via conduit 44 and passed via conduit 11 into dryer 12. Effluent from dryer 12 is mixed in conduit 13 with hydrogen fluoride from conduit 14 and the resulting mixture introduced into reactor 16 for reaction as previously described. Effluent from said reactor 16 is passed via conduit 17, compressor 18, and cooled in condenser 19, as previously described. The compressed and cooled reactor effluent is passed from condenser 19 via conduit 46 into separator 47. In this embodiment of the invention, condenser 19 is operated at a temperature sufficient to liquefy substantially all of the reactor effluent except the hydrogen and methane contained therein. In separator 47 a separation is effected between the thus liquefied reaction products and said hydrogen and methane. Said uncondensed gases are removed from separator 47 via conduit 48 through the expansion valve therein. A portion of said uncondensed gases is recycled via conduit 49 to said plasma generator as a portion or all of the plasma-forming gas utilized therein. Another portion of said uncondensed gases is passed via conduit 51 for utilization as a source of hydrogen in hydrogen-consuming processes such as hydrogenation, etc. In many instances, this stream will be sufficiently concentrated that no further treatment is necessary and it can be used directly in said hydrogen-consuming processes.

Bottoms effluent from separator 47 is passed via conduit 22 through the expansion valve therein into said low temperature fractionator 23 for fractionation. As described above, a stream comprising hydrogen fluoride and the gem-difluoroalkane produced in the process, e.g., 1,1-difluoroethane, is recycled via conduit 24 to conduit 13 for introduction into reactor 16 for the further production of vinyl fluoride. A stream comprising unreacted acetylene, ethylene, and vinyl fluoride is withdrawn overhead from fractionator 23 via conduit 26 and passed via conduit 52 into absorber 53 wherein it is contacted countercurrently in known manner with a stream of dimethylformamide introduced via conduit 54. Said dimethylformamide absorbs the unreacted acetylene from said overhead stream from fractionator 23. A stream comprising essentially ethylene and vinyl fluoride is removed overhead from absorber 53 and passed via conduits 56 and 28 into low temperature fractionator 29. A stream comprising essentially ethylene is removed overhead from fractionator 29 via conduit 31. Said ethylene stream can be passed via conduit 32 to an ethylene purification plant as described above, vented from the system, or can be recycled as shown via conduit 79 into the plasma generator as part of the hydrocarbon charge stock thereto. A stream comprising essentially pure vinyl fluoride product is removed as bottoms product from said fractionator 29 via conduit 33.

Depending upon the purity desired in the vinyl fluoride product, and the ethylene content of the charge stream to reactor 16, the stream removed overhead from absorber 53 can be removed via conduits 56 and 57 as product of the process.

The acetylene-rich dimethylformamide absorbent is removed from absorber 53 via conduit 58 and introduced into stripper 59 wherein it is contacted countercurrently with a suitable stripping gas introduced via conduit 60. If desired, a portion of the hydrogen recycle stream in conduit 49 can be utilized for this purpose. Other stripping gases can be introduced from an outside source via conduit 61, if desired. A stream comprising acetylene is removed overhead from stripper 59 via conduit 62 and, depending upon the concentration of acetylene therein, can be recycled via conduit 31 to said plasma generator, or can be recycled via conduit 63 to conduit 11 for utilization as acetylene feedstock. As will be understood by those skilled in the art, when the concentration of acetylene in conduit 62 is less than the concentration of acetylene in conduit 44, then the stream in conduit 62 is preferably recycled to the plasma generator. When the concentration of acetylene in the stream in conduit 62 is greater than the concentration of acetylene in conduit 44, then the stream in said conduit 62 is preferably recycled to said conduit 11.

In still another embodiment of the invention, when a stream consisting essentially of pure acetylene is introduced via conduit 10, passed through dryer 12, and reacted with hydrogen fluoride in reactor 16 as described above, the reactor effluent can be passed via conduit 17, compressor 18, condenser 19, conduits 21 and 22 and fractionated in fractionators 23 and 29 as described above. In this embodiment of the invention, the overhead from fractionator 29 will comprise essentially pure unreacted acetylene and can be passed via conduits 31 and 64 into said conduit 63 for recycle to reactor 16. Or, if desired, in this embodiment of the invention the overhead from fractionator 23 can be passed via conduits 26 and 52 into absorber 53 wherein the unreacted acetylene is removed therefrom. In this instance, the overhead stream from absorber 53 will be the vinyl fluoride product of the process and can be removed from the system via conduits 56 and 57. The absorbed unreacted acetylene will be stripped from the dimethylformamide absorbent in stripper 59 as described above and recycled via conduits 62 and 63 as a portion of the charge stock to be utilized in reactor 16.

In still another embodiment of the invention, the effluent from reactor 16, instead of being compressed as previously described, can be passed via conduits 17 and 66 into condenser 67. Prior to being introduced into condenser 67 said reactor effluent in conduit 66 is quenched with a portion of the 1,1-difluoroethane-hydrogen fluoride mixture from conduit 24 which is introduced into said conduit 66 via conduit 68. The thus quenched reactor effluent, after being further cooled in condenser 67, is passed via conduit 22 into fractionator 23 for fractionation and further recovery of the vinyl fluoride product of the process by one of the methods described above.

Operating conditions, not already set forth above, for the various zones and items of equipment described in connection with the drawing are set forth below. As will be understood by those skilled in the art, all the operating conditions set forth herein are interrelated and variation in conditions in one zone or item of equipment can cause variation in conditions in other zones or items of equipment. Thus, the operating conditions set forth herein are given by way of example only and are not to be considered as limiting on the scope of the invention. Those skilled in the art will have no difficulty in determining suitable operating conditions in view of this disclosure.

Compressor 18:
    Outlet pressure, broad range, 200 to 500 p.s.i.g.
    Outlet pressure, preferred range, 370 to 420 p.s.i.g.

Condensers 19 and 67:
    Outlet temperature, broad range, −50 to −170° F.
    Outlet temperature, preferred range, −90 to −110° F.

Separator 47:
    Pressure, broad range, 200 to 500 p.s.i.g.
    Pressure, preferred range, 370 to 420 p.s.i.g.
    Temperature, broad range, −50 to −200° F.
    Temperature, preferred range, −90 to −120° F.

Fractionator 23:
    Pressure, broad range, 0.5 to 5 atm.
    Pressure, preferred range, 1 to 2 atm.
    Top temperature, broad range, −25 to −200° F.
    Top temperature, preferred range, −80 to −110° F.
    Bottom temperature, broad range, 0 to 100° F.
    Bottom temperature, preferred range, 40 to 75° F.

Fractionator 29:
    Pressure, broad range, 0.5 to 5 atm.
    Pressure, preferred range, 1 to 2 atm.
    Top temperature, broad range, −50 to 200° F.
    Top temperature, preferred range, −110 to −130° F.
    Bottom temperature, broad range, −20 to −150° F.
    Bottom temperature, preferred range, −70 to −90° F.

Absorber 53:
    Pressure, broad range, 0.5 to 5 atm.
    Pressure, preferred range, 1 to 2 atm.
    Temperature, broad range, −50 to 75° F.
    Temperature, preferred range, −50 to −25° F.
    Mols of gas/mol of DMF, broad, 0.1 to 100
    Mols of gas/mol of DMF, preferred, 1 to 10

Stripper 59:
    Pressure, broad range, 0.1 to 5 atm.
    Pressure, preferred range, 0.5 to 1 atm.
    Temperature, broad range, −100 to 100° F.
    Temperature, preferred range, −25 to 0° F.
    Mols stripping gas/mol DMF, broad, 0.1 to 500
    Mols stripping gas/mol DMF, preferred, 1 to 10

The following examples will serve to further illustrate our invention.

Example I

In this run a hydrocarbon stream from an ethylene purification unit and comprising 56.5 weight percent acetylene and 43.5 weight percent ethylene is introduced via conduit 10 into a system substantially like that illustrated in the drawing. The acetylene in said stream is hydrofluorinated with HF in reactor 16 at a temperature of about 675° F., a pressure of about 15 p.s.i.g., and a space velocity of about 450 volumes per volume of catalyst per hour, employing a fluidized bed of an activated alumina-aluminum fluoride catalyst. Said catalyst is prepared by treating gamma-alumina with a stream of dry HF containing 50 volume percent nitrogen at a temperature ranging from 280° F. initially to 620° F. over a period of 4 hours. Effluent from reactor 16 is passed via conduits 17 and 66, condenser 67, and conduit 22 into fractionator 23. Bottoms product from said fractionator 23 comprising 1,1-difluoroethane, hydrogen fluoride, and a small amount of vinyl fluoride is recycled via conduit 24 to said reactor 16. Overhead product from said fractionator 23 is passed via conduits 26, 27, and 28 into fractionator 29. Overhead product from said fractionator 29 is recycled via conduits 31 and 32 to said ethylene purification unit. Vinyl fluoride product is withdrawn as bottoms product from said fractionator 29 via conduit 33. Operating conditions for said condenser 67, said fractionator 23, and said fractionator 29 are maintained within the preferred ranges given above for said equipment. Charge rates and product distribution, based on 100 pounds of said hydrocarbon feed stream, for the principal streams are set forth in Table I below. Said data show an efficient, essentially 90 percent conversion of acetylene to vinyl fluoride.

TABLE I

[Pounds—based on 100 lbs. in conduit 10]

| Stream No. | 10 | 14 | 24 | 17 | 26 | 31 | 33 |
|---|---|---|---|---|---|---|---|
| Component: | | | | | | | |
| Acetylene | 56.5 | | (*) | 5.6 | 5.6 | 5.6 | (*) |
| 1,1-difluoroethane | | | 202.5 | 202.5 | <0.5 | (*) | <0.5 |
| Ethylene | 43.5 | | (*) | 43.5 | 43.5 | 43.5 | (*) |
| Hydrogen fluoride | | 39.7 | 211.0 | 211.0 | | | |
| Vinyl fluoride | | | 5.7 | 94.8 | 89.1 | <0.4 | 88.7 |
| Total | 100 | 39.7 | 419.2 | 557.4 | 138.7 | 49.5 | 89.2 |

*Trace.

Example II

In this run methane is contacted with a high temperature hydrogen plasma stream to form acetylene which is subsequently reacted with hydrogen fluoride to form vinyl fluoride. In this example, 178 pounds of methane and 12.9 pounds of hydrogen are required as feed for the plasma generator for the production of each 100 pounds of acetylene. The system employed is substantially like that illustrated in the drawing. A contact temperature of about 3600° F. and a contact time of about 0.001 second are employed in contact zone 72. The effluent stream from quench zone 73 is passed through carbon removal zone 42, dryer 12, and the acetylene in said stream is hydrofluorinated with HF in reactor 16 employing the same catalyst under substantially the same conditions as described in Example I above. Effluent from reaction zone 16 is compressed in compressor 18, cooled and partially condensed in condenser 19, and then passed into gas-liquid separator 47. A stream comprising hydrogen and methane is withdrawn overhead from said separator 47 through the expansion valve shown and recycled via conduits 48 and 49 to plasma generator 71. The liquid phase in separator 47 is withdrawn from the bottom thereof through the expansion valve shown and passed via conduit 22 into fractionator 23. Said liquid phase is then fractionated in fractionators 23 above in Example I. Overhead product from said fractionator 23 is passed via conduits 26 and 52 to absorber 53 and therein contacted with dimethylformamide (DMF) introduced via conduit 54. Overhead from absorber 53 is passed via conduits 56 and 28 into fractionator 29. A stream comprising ethylene is removed overhead from fractionator 29 via conduit 31, and vinyl fluoride product is removed as bottoms product via conduit 33. Operating conditions for said compressor 18, condenser 19, separator 47, fractionator 23, fractionator 29, and absorber 53 are maintained within the preferred ranges given above for said equipment. Charge rates and product distribution, based on 100 pounds of acetylene, for the principal streams are set forth in Table II below.

reaction mixture, can be utilized as the plasma-forming gas. Said method also incorporates recycle of the mixture of hydrogen fluoride and 1,1-difluoroethane from the bottom of fractionator 23, thus increasing the yield of vinyl fluoride. Thus, a lower cost for producing said vinyl fluoride is realized.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. A process for producing an unsaturated monofluoride hydrocarbon derivative, which process comprises, in combination, the steps of: reacting hydrogen fluoride and an acetylenic hydrocarbon containing only 1 carbon to carbon triple bond and not more than 10 carbon atoms per molecule in a reaction zone under hydrofluorination conditions in the presence of a hydrofluorination catalyst; withdrawing reaction mixture effluent from said reaction zone; fractionating said effluent to obtain therefrom a first stream comprising said unsaturated monofluoride hydrocarbon derivative and unreacted acetylenic hydrocarbon, and a second stream comprising unreacted hydrogen fluoride and a gem-difluoroalkane containing the same number of carbon atoms as said acetylenic hydrocarbon reactant; recycling said second stream, without separation of the hydrogen fluoride and the gem-difluoroalkane therein, to said reaction zone; and recovering said unsaturated monofluoride hydrocarbon derivative from said first stream.

2. A process for producing an unsaturated monofluoride hydrocarbon derivative, which process comprises, in combination, the steps of: passing hydrogen fluoride and an acetylenic hydrocarbon containing only 1 carbon to carbon triple bond and not more than 10 carbon atoms per molecule into a reaction zone in a mol ratio of hydrogen fluoride to acetylenic hydrocarbon within the range of from 0.5:1 to 20:1 in said reaction zone, reacting said hydrogen fluoride and said hydrocarbon at a temperature within the range of from 350 to 900° F. in the presence of a catalyst active for hydrofluorinating said acetylenic hydrocarbon with hydrogen fluoride under said conditions; withdrawing reaction mixture effluent from said reaction zone; fractionating said effluent to obtain therefrom a first stream comprising said unsaturated monofluoride hydrocarbon and unreacted acetylenic hydrocarbon, and a second stream comprising unreacted hydrogen fluoride and a gem-difluoroalkane containing the same number of carbon atoms as said acetylenic hydrocarbon reactant; recycling said second stream, without separation of the hydrogen fluoride and the gem-difluoroalkane therein, to said reaction zone; and recovering said unsaturated monofluoride hydrocarbon derivated from said first stream.

TABLE II

[Pounds—based on 100 lbs. of acetylene in conduit 41]

| Stream Number | 41 | 43 | 44 | 14 | 17 | 49 | 51 | 22 | 26 | 24 | 28 | 31 | 33 | 58 | 54 | 62 | 60 |
|---|---|---|---|---|---|---|---|---|---|---|---|---|---|---|---|---|---|
| Component: | | | | | | | | | | | | | | | | | |
| Hydrogen | 44.5 | | 44.5 | | 44.5 | 12.5 | 32.0 | | | | | | | | | 6.0 | [1] 6.0 |
| Methane | 6.2 | | 6.2 | | 6.2 | 1.7 | 4.5 | | | | | | | | | 0.8 | [1] 0.8 |
| Acetylene | 100 | | 100 | | 9.9 | | | 9.9 | 9.9 | *T | 0.5 | 0.5 | *T | 9.5 | 0.05 | 9.4 | |
| Ethylene | 3.2 | | 3.2 | | 3.2 | | | 3.2 | 3.2 | *T | 2.5 | 2.5 | *T | 0.7 | *T | 0.7 | |
| Carbon | 17 | 17 | | | | | | | | | | | | | | | |
| 1,1-difluoroethane | | | | | | | | 358 | | 358 | 1 | 357 | 1 | 1 | | | |
| Hydrogen fluoride | | | | 70.2 | 374 | | | 374 | | 374 | | | | | | | |
| Vinyl fluoride | | | | | 167.7 | | | 167.7 | 157.6 | 10.1 | 157.6 | 0.6 | 157 | *T | *T | *T | |
| DMF [2] | | | | | | | | | | | | | | | 300 | 300 | |
| Total | 170.9 | 17 | 153.9 | 70.2 | 953.6 | 14.2 | 36.5 | 912.8 | 170.7 | 741.1 | 161.3 | 4.3 | 158 | 310.2 | 300.05 | 16.9 | [1] 6.8 |

[1] To be subtracted from amount shown in conduit or stream 49.  [2] Dimethylformamide.  *Trace.

By the above method illustrated in Example II, the basic separation problem with respect to the hydrocarbon feedstock, i.e., the separation of hydrogen is eliminated. Furthermore, the hydrogen, after separation from the 3. A process for producing vinyl fluoride, which process comprises, in combination, the steps of: reacting hydrogen fluoride and acetylene in a reaction zone under hydrofluorination conditions in the presence of a hydrofluorination catalyst; withdrawing reaction mixture effluent from said reaction zone; fractionating said effluent to obtain therefrom a first stream comprising said vinyl fluoride and unreacted acetylene, and a second stream comprising unreacted hydrogen fluoride and 1,1-difluoroethane; recycling said second stream, without separation of the hydrogen fluoride and the 1,1-difluoroethane therein, to said reaction zone; and recovering said vinyl fluoride from said first stream as product of the process.

4. A process for producing vinyl fluoride, which process comprises, in combination, the steps of: passing hydrogen fluoride and acetylene into a reaction zone in a mol ratio of hydrogen fluoride to acetylene within the range of from 0.5:1 to 20:1; in said reaction zone, reacting said hydrogen fluoride and said hydrocarbon at a temperature within the range of from 350 to 900° F. in the presence of a catalyst active for hydrofluorinating said acetylenic hydrocarbon with hydrogen fluoride under said conditions; withdrawing reaction mixture effluent from said reaction zone; fractionating said effluent to obtain therefrom a first stream comprising vinyl fluoride and unreacted acetylene, and a second stream comprising unreacted hydrogen fluoride and 1,1-difluoroethane; recycling said second stream, without separation of the hydrogen fluoride and the 1,1-difluoroethane therein, to said reaction zone; and recovering said vinyl fluoride from said first stream as product of the process.

5. A process for producing vinyl fluoride, which process comprises, in combination, the steps of: passing a hydrocarbon stream containing a major proportion of acetylene and a minor proportion of ethylene into a reaction zone; passing hydrogen fluoride in a mol ratio of hydrogen fluoride to said acetylene within the range of from 1:1 to 5:1 into said reaction zone; in said reaction zone, reacting said hydrogen fluoride and said acetylene at a temperature within the range of from 350 to 900° F. in the presence of a catalyst active for hydrofluorinating acetylene with hydrogen fluoride under said conditions; withdrawing reaction mixture effluent from said reaction zone; fractionating said effluent to obtain therefrom a first stream comprising vinyl fluoride, unreacted acetylene, and ethylene, and a second stream comprising 1,1-difluoroethane and unreacted hydrogen fluoride; recycling said second stream, without separation of the hydrogen fluoride and the 1,1-difluoroethane therein, to said reaction zone; passing said first stream to an absorption zone and therein contacting same with an absorbent to selectively absorb said unreacted acetylene; passing rich absorbent from said absorption zone to a stripping zone and therein stripping said absorbed acetylene from said rich absorbent; recycling said stripped acetylene to said reaction zone; and passing the unabsorbed effluent comprising vinyl fluoride and ethylene from said absorption zone to fractionation zone and therein fractionating said last-mentioned effluent to recover said vinyl fluoride therefrom.

6. A process for producing vinyl fluoride, which process comprises, in combination, the steps of: passing a stream of acetylene into a reaction zone; passing hydrogen fluoride in a mol ratio of hydrogen fluoride to said acetylene within the range of from 1:1 to 5:1 into said reaction zone; in said reaction zone, reacting said hydrogen fluoride and said acetylene at a temperature within the range of from 350 to 900° F. in the presence of a catalyst active for hydrofluorinating acetylene with hydrogen fluoride under said conditions. withdrawing reaction mixture effluent from said reaction zone; fractionating said effluent to obtain therefrom a first stream comprising vinyl fluoride and unreacted acetylene, and a second stream comprising 1,1-difluoroethane and unreacted hydrogen fluoride; recycling said second stream, without separation of the hydrogen fluoride and the 1,1-difluoroethane therein, to said reaction zone; and fractionating said first stream to recover said vinyl fluoride therefrom.

7. A process for producing vinyl fluoride, which process comprises, in combination, the steps of: passing a stream of acetylene into a reaction zone; passing hydrogen fluoride in a mol ratio of hydrogen fluoride to said acetylene within the range of from 1:1 to 5:1 into said reaction zone; in said reaction zone, reacting said hydrogen fluoride and said acetylene at a temperature within the range of from 350 to 900° F. in the presence of a catalyst active for hydrofluorinating acetylene with hydrogen fluoride under said conditions; withdrawing reaction mixture effluent from said reaction zone; fractionating said effluent to obtain therefrom a first stream comprising vinyl fluoride and unreacted acetylene and a second stream comprising 1,1-difluoroethane and unreacted hydrogen fluoride; recycling said second stream, without separation of the hydrogen fluoride and the 1,1-difluoroethane therein, to said reaction zone; passing said first stream to an absorption zone and therein contacting same with an absorbent to selectively absorb said unreacted acetylene; passing rich absorbent from said absorption zone to a stripping zone and therein stripping said absorbed acetylene from said rich absorbent; recycling said stripped acetylene to said reaction zone as a portion of the feed thereto; and recovering said vinyl fluoride from the unabsorbed effluent from said absorption zone.

References Cited
UNITED STATES PATENTS

| | | | |
|---|---|---|---|
| 2,634,300 | 4/1953 | Hillyer et al. | 260—653.4 |
| 2,716,143 | 8/1955 | Skiles | 260—653.4 |
| 3,236,906 | 2/1966 | Margiloff | 260—679 |
| 3,248,446 | 4/1966 | Pollock et al. | 260—679 |

DANIEL D. HORWITZ, *Primary Examiner.*